Jan. 21, 1958
W. VANCE
2,820,634
ARROWHEAD ASSEMBLY
Filed April 12, 1957
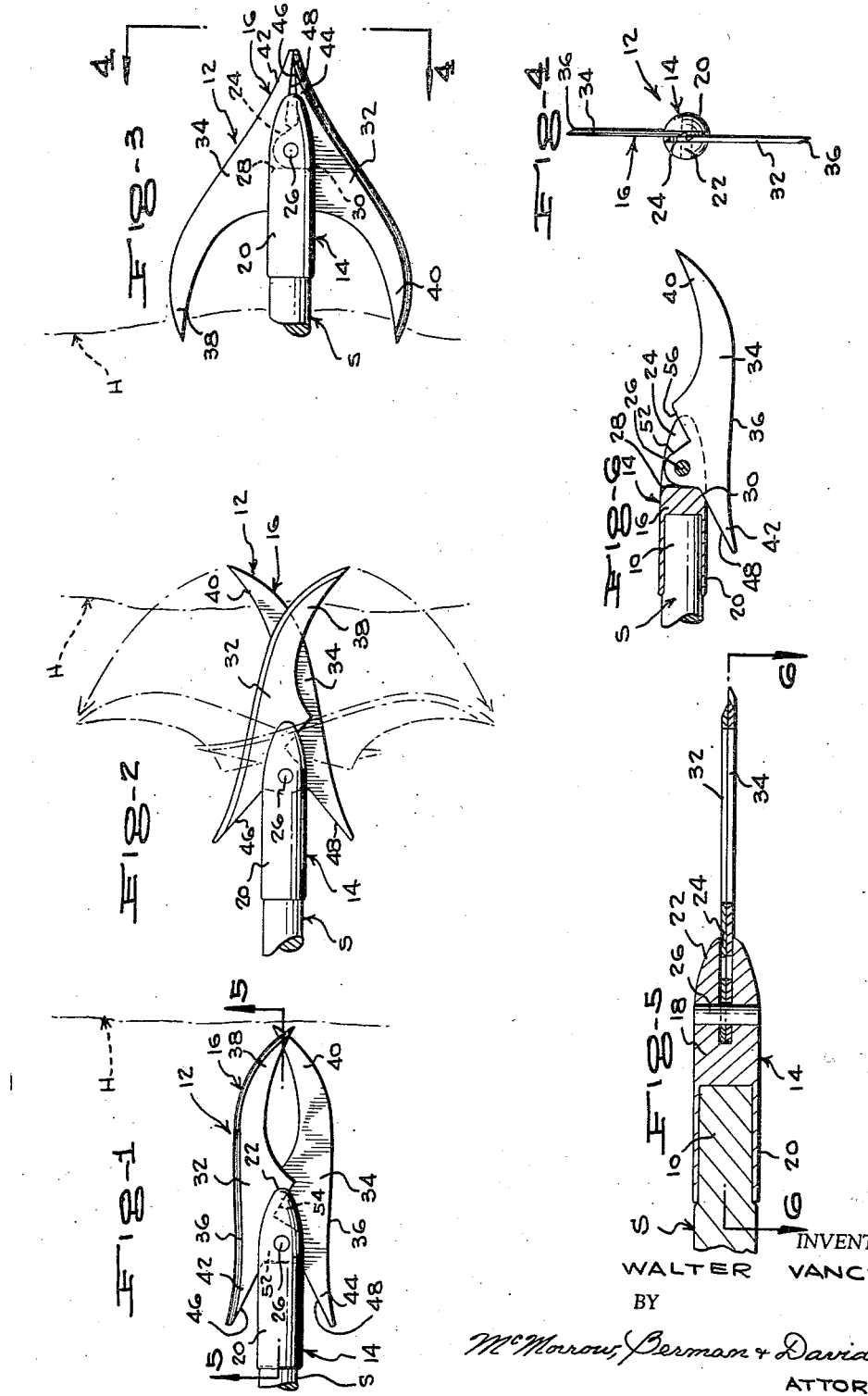
INVENTOR.
WALTER VANCE
BY
McMorrow, Berman & Davidson
ATTORNEYS

United States Patent Office 2,820,634
Patented Jan. 21, 1958

2,820,634

ARROWHEAD ASSEMBLY

Walter Vance, Northfield, Ohio

Application April 12, 1957, Serial No. 652,440

3 Claims. (Cl. 273—106.5)

This invention relates generally to the archery art and is more particularly concerned with an improved arrowhead.

Of recent years, the bow and arrow has come into great prominence as means for hunting game. Unless an individual is exceptionally proficient in the use of a bow and arrow, oftentimes an animal, such as a deer, for example, is injured and subsequently escapes from the hunter, said animals often developing gangrene, for example, and it is accordingly desirable that such animals be wounded to the degree wherein they will be immobilized to subsequently be put out of their misery. Additionally, animals which are wounded and develop gangrene, for example, are subsequently killed by another hunter, if said second hunter is not aware of the sick condition of an animal, he may inadvertently utilize the meat thereof and accordingly this is a dangerous condition.

When utilizing a modern gun in hunting big game such as deer or the like, the impact power of the gun upon striking said game is generally sufficient, even if the game is wounded superficially, to place the animal in a state of shock wherein the animal is substantially immobilized. It is quite impossible to develop the shocking power of the high powered rifle with a bow and arrow. However, if an arrow can be projected at maximum velocity and includes a razor sharp arrowhead, it may have sufficient force to pass entirely through the animal causing internal and external hemorrhaging, and the faster the animal bleeds the sooner he will stop and the more obvious trail of his movement will be left in order that the animal may be recovered by the hunter. Accordingly, it is highly desirable to inflict on the animal being hunted a mortal wound when hunting with the bow and arrow, wherein the arrow attains a relatively high velocity tending to pass through the animal to cause as little disturbance to the animal as possible, wherein said arrow incorporates an extremely sharp arrowhead causing an exceptionally large wound causing maximum hemorrhaging, wherein the animal will remain in the locale of where it has been struck for subsequent recovery by the hunter. Arrowheads utilized in the past have had a tendency to push aside the arteries and blood vessels in an animal's body which has been struck, and although causing a mortal wound, the animal has sufficient control of its faculties to move a considerable distance from the spot at which it has been struck by the arrow. Additionally, the aforementioned conventional arrows do not attain a sufficiently large wound in the animal which has been struck to leave a blood trail that will be easy to follow by the hunter.

The requisites or main objectives in the archery art when projecting an arrow are to obtain maximum distance of flight, a relatively flat trajectory in order that the arrow may be properly aimed, then to obtain sufficient cutting and penetration upon striking a target. The design of the projectile or arrow plays an important part in attaining the aforementioned objectives. To a substantial degree, if one of the objectives is emphasized over the others, the others are normally sacrificed. For example, by increasing the size of span of the arrowhead i. e. increasing the weight, there is a loss of distance of flight and reduction of velocity. However, a greater area will be struck and a larger wound will be achieved when the target is reached. Additionally, by reducing the size of the arrowhead an increased distance of flight may be attained in conjunction with a relatively flat trajectory, but the size of the wound is diminished. Thus it is highly desirable in order to attain maximum efficiency in the use of the bow and arrow, particularly in hunting, to have available an arrow which when projected will afford maximum flight or distance at a relatively flat trajectory and have sufficient velocity and cutting area to inflict an effective wound to immobilize the animal which is being hunted.

The primary object of this invention is to provide an improved arrowhead assembly affording all of the objectives heretofore set forth including means whereby blade elements of the arrowhead assembly automatically operate or function due to engagement with an animal toward which the arrow has been projected.

Another object of invention in conformance with that set forth is to provide an improved arrowhead assembly of the character involved incorporating a blade assembly including a pair of symmetrical blade elements pivoted on a common axis of rotation normal to the longitudinal axis of the shaft of an arrow upon which the assembly is secured, said blade elements including overlying elongated converging and intersecting leading end portions and diverging trailing end portions, said blade elements incorporating opposed longitudinal sharpened razor edges for severing and penetrating the hide of an animal toward which the arrow is projected, and including abutment shoulders orienting the blade elements to a first position normally assumed thereby during flight of the arrow which attains during said flight a relatively flat trajectory with a minimum of planing of the arrow and attaining during flight a maximum distance at a relatively high velocity, said blade elements upon striking a target pivoting to a position as a result of the engagement with the target to afford a greater cutting area wherein the relative position of the leading and trailing ends of the blade elements are reversed.

And yet another object of invention in conformance with that set forth is to provide an improved arrowhead assembly of the character involved which is readily and economically manufactured, easily used and maintained, and highly satisfactory, efficient, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a top plan view of the novel arrowhead assembly showing the same mounted on the terminal end of an arrow shaft, showing by means of a phantom line the relative position of the hide of an animal just before the arrowhead assembly strikes the same;

Figure 2 is a view similar to Figure 1, showing the position assumed by the arrowhead assembly after partially entering the hide of an animal, and showing by means of phantom lines the manner in which the blade elements of the arrowhead assembly rotate after continued movement of the arrowhead assembly into the body of the animal;

Figure 3 is a plan view similar to Figures 1 and 2, showing the relative position assumed by the blade elements of the arrowhead assembly after the same ultimately engages the body of an animal through which the arrow is passing;

Figure 4 is an end view looking substantially from line 4—4 of Figure 3;

Figure 5 is an enlarged section taken substantially on the plane of line 5—5 of Figure 1; and Figure 6 is a section taken substantially on the plane of line 6—6 of Figure 5.

Referring to the drawing in detail, indicated generally at S is a conventional arrow shaft of any suitable character including on the terminal end thereof a reduced diametered portion 10 which will have secured thereon in longitudinally extending relationship the improved arrowhead assembly indicated generally at 12. Indicated generally at H, see Figures 1 through 3, is the outer surface of the hide of an animal toward which the arrow will have been projected.

The arrowhead assembly 12 is constructed of any suitable material. The arrowhead assembly 12 includes a support member indicated generally at 14 and a head or blade assembly indicated generally at 16.

The support member 14 comprises an elongated body member 18 including at one end, conveniently defined as the rear-end, a tubular ferrule portion 20 telescopically receiving therein the reduced diametered portion 10 of the shaft S of the arrow. The opposite end of the support member has a conical or dome-like configuration as indicated at 22 and has extending diametrically thereacross in alignment with the longitudinal axis of the body member and opening toward the dome-like end 22 an elongated slot portion 24. Extending transversely through the slot portion 24 and normal thereto as well as being normal to the longitudinal axis of the support member is a suitable support shaft 26, secured in any suitable manner, which extends through an intermediate portion of said slot portion 24.

If desired, as most clearly seen in Figure 6, the body member 18 may be slightly relieved or rounded as indicated at 28 and 30 of the rear-end of the slot portion 24 providing abutment shoulders for engagement with abutment portions of blade elements of the head or blade assembly 16 as will subsequently be described in detail.

The head or blade assembly 16 comprises a pair of symmetrical similar blade elements 32 and 34 which are substantially elongated which are intermediately pivoted on the pivot shaft 26. Each of the blade elements 32 and 34 incorporate an opposed outer razor-sharpened or beveled outer edge 36 which extends the length thereof. When mounted on the support member 14, the blade elements 32 and 34 include a leading end 38 and 40, respectively, which is arcuately conformed and disposed in converging intersecting relationship and may be in slight frictional engagement to tend to retain the blade elements in the position in Figure 1, this being the position assumed by the head assembly during flight of the arrow. The blade elements 32 and 34, when mounted on the support member 14 incorporate diverging trailing ends 42 and 44, respectively, of a lesser length, measuring from the pivot shaft 26, than the leading ends of the blade elements. Extending from the trailing ends 42 and 44 of the blade elements in angular relationship are substantially linear abutment shoulders 46 and 48, respectively, which extend into a laterally extending transversely apertured pivot ear portion 50 and 52, respectively, which are journaled on the pivot shaft 26 in juxtaposed overlying relationship. Extending in substantially parallel offset relationship relative to the linear abutment shoulders 46 and 48 on the respective blade elements, are second linear abutment shoulders 54 and 56, respectively, said abutment shoulders 46 and 48, and 54 and 56, being abuttingly engageable with the shoulder portions 28 or 30 on the support member 14.

During flight of the arrow, the blade elements define a substantially reduced width, the leading ends thereof being disposed in the condition shown in Figure 1, the abutment shoulders 46 and 48 abuttingly engaging the abutment portions 28 and 30, respectively, see Figure 6, for example. During this condition, the arrowhead assembly offers a minimum of resistance to movement of the arrow during flight, the trailing ends thereof defining relative to the longitudinal axis of the arrow shaft the maximum span of the arrowhead assembly. During this condition, the arrow may be projected from a suitable bow at a maximum velocity, in a relatively flat trajectory when a minimum of planing will occur. Considering Figure 2, the arrowhead assembly is illustrated as having partially entered the hide H of an animal or the like and the leading ends of the blade elements will be pivoted in a scissor-like action away from each other as the arrow continues to move through the outer surface of the hide of the animal. The blade elements will ultimately attain a laterally disposed relationship as illustrated by the phantom lines of Figure 2. Continued progress of the arrowhead assembly into the body of the animal results in the arrowhead assembly ultimately being disposed in the condition shown in Figure 3, wherein the leading ends 38 and 40 of the blade elements are disposed in trailing relationship relative to the trailing ends 42 and 44, respectively, said trailing ends being disposed adjacent each other and oriented in this position with the abutment shoulders 54 and 56 respectively engaging the abutment portions 28 and 30 of the support member 14. During this condition, an increased span or cutting area is attained accordingly causing a more serious and deadly wound than that inflicted by an arrowhead encompassing the span as shown in Figure 1. Additionally, in addition to the increased cutting area formed by the arrowhead assembly, there is a greater possibility and insurance that the various arteries, veins etc. will be severed within the animal's body causing increased internal and external hemorrhaging for the purposes mentioned.

Thus there has been disclosed a novel arrowhead assembly which fully conforms and achieves the desirable requisites set forth in the objects of invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. An arrowhead assembly comprising a support member including means for securing the same longitudinally of the terminal end of an arrow shaft, and a blade assembly on said support member, said blade assembly comprising a pair of symmetrical elongated blade elements intermediately and freely pivoted on a common axis of rotation normal to the longitudinal axis of the support member, said blade elements including forward leading converging ends overlying each other and continuing therebeyond and trailing diverging ends, said blade elements including opposed sharpened longitudinal outer edges along the length thereof, the leading ends of the blade elements being pivotal across each other when engaging a target and the trailing ends being positionable adjacent each other to provide an increased span to the arrowhead assembly greater than the span thereof when the same is initially projected from a bow or the like.

2. In an arrowhead assembly as set forth in claim 1 wherein said blade elements include abutment shoulders extending angularly from the sharpened longitudinal edges thereof engageable on opposite sides of the support member for orienting the leading and trailing ends of the blade elements during flight and impact for attaining optimum flight and wound-forming characteristics.

3. In an arrowhead assembly as set forth in claim 2 wherein said blade elements include transversely apertured pivot ear elements extending laterally from the abutment shoulders in juxtaposed relationship on an intermediate portion of the support member.

References Cited in the file of this patent

UNITED STATES PATENTS

| | | |
|---|---|---|
| 707,683 | Farwell | Aug. 26, 1902 |
| 2,289,284 | Chandler | July 7, 1942 |
| 2,455,784 | Lapsensohn | Dec. 7, 1948 |
| 2,568,417 | Steinbacher | Sept. 18, 1951 |